United States Patent [19]
Dearden et al.

[11] 4,451,922
[45] May 29, 1984

[54] TRANSMISSION LOGIC PARITY CIRCUIT

[75] Inventors: Ziba T. Dearden, Manassas; Yogi K. Puri, Vienna, both of Va.

[73] Assignee: IBM Corporation, Armonk, N.Y.

[21] Appl. No.: 332,706

[22] Filed: Dec. 21, 1981

[51] Int. Cl.³ .......................... G06F 11/10; H04L 1/10
[52] U.S. Cl. ........................................ 371/49; 307/572
[58] Field of Search ................. 371/49; 307/471, 441, 307/572

[56] References Cited

U.S. PATENT DOCUMENTS

| | | | |
|---|---|---|---|
| 3,846,751 | 11/1974 | Prieto | 371/49 |
| 4,006,365 | 2/1977 | Marzin et al. | 307/471 |
| 4,049,974 | 9/1977 | Boone et al. | 371/49 |

Primary Examiner—Charles E. Atkinson
Attorney, Agent, or Firm—John E. Hoel

[57] ABSTRACT

An FET transmission logic parity circuit is disclosed which determines the odd or even status of register bits using zero DC current transmission logic. The circuit has a first two FET devices which propagate the state of the preceding odd or even nodes and the corresponding register bit is logically a zero. A second pair of FET devices switch the state of the odd or even nodes when the corresponding register bit is logically a one. In this manner, the output nodes are statically conditioned to either a first potential or a second potential, depending upon the register bit states and no DC current flows between the first and second potential.

3 Claims, 1 Drawing Figure

TRANSMISSION LOGIC PARITY CIRCUIT

TRANSMISSION LOGIC
PARITY CIRCUIT

TRANSMISSION LOGIC PARITY CIRCUIT

FIELD OF THE INVENTION

The invention disclosed broadly relates to semiconductor circuits and more particularly relates to an improved FET parity generation circuit.

BACKGROUND OF THE INVENTION

Parity generation pertains to the use of a self-checking code employing binary digits in which the total number of ones (or zeros) in each permissible code expression is always even or always odd. A check may then be made for either even parity or odd parity to determine whether errors have occurred in the binary digit. The parity bit is a binary number appended to the array of bits to make the sum of all the bits always odd or always even.

A variety of parity generation and checking circuits have been described in the prior art. Each improvement attempts to increase the speed and reduce the size of the circuit for generating a parity bit from a multiple digit binary number. A typical approach is shown in U.S. Pat. No. 4,224,680 which discloses a parity checker which includes a ripple-carry type counter where the parity bit is produced by a single network of NAND gates connected in series from high order to low order counter bits. One significant problem with such prior art parity generation and checking circuits is that as they become progressively smaller when embodied on an integrated circuit chip, the power dissipated by the circuit per unit area tends to increase, thereby limiting both the size and the speed of the resultant parity generation circuit.

OBJECT OF THE INVENTION

It is therefore an object of the invention to provide an improved parity generation circuit.

It is therefore another object of the invention to provide a parity generation circuit which dissipates a minimum quantity of power.

It is still a further object of the invention to provide an improved parity generation circuit having a simple topology and small layout area.

It is yet a further object of the invention to provide an improved parity generation circuit which is capable of integration on an integrated circuit chip in a small layout area and yet dissipates a relatively small quantity of power per unit area.

SUMMARY OF THE INVENTION

These and other objects, features and advantages of the invention are achieved by the transmission logic parity circuit disclosed herein. An FET transmission logic parity circuit is disclosed which determines the odd or even status of register bits using zero DC current transmission logic. The circuit has a first two FET devices which propagate the state of the preceding odd or even nodes and the corresponding register bit is logically a zero. A second pair of FET devices switch the state of the odd or even nodes when the corresponding register bit is logically a one. In this manner, the output nodes are statically conditioned to either a first potential or a second potential, depending upon the register bit states and no DC current flows between the first and second potentials.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
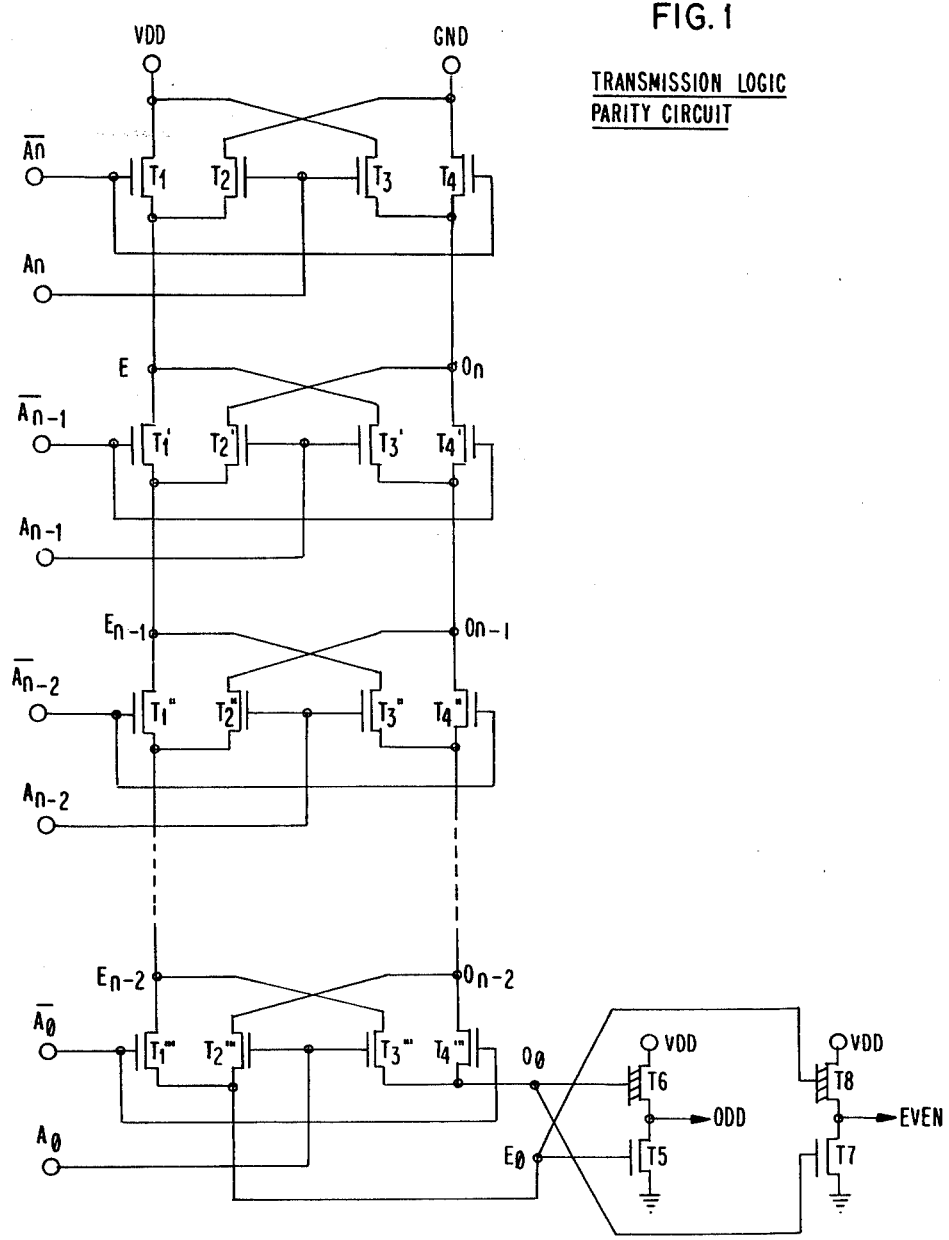
FIG. 1 illustrates a schematic circuit diagram of the transmission logic parity circuit invention.

An FET transmission logic parity circuit is disclosed which determines the odd or even status of register bits using zero DC current transmission logic. The circuit has a first two FET devices which propagate the state of the preceding odd or even nodes and the corresponding register bit is logically a zero. A second pair of FET devices switch the state of the odd or even nodes when the corresponding register bit is logically a one. In this manner, the output nodes are statically conditioned to either a first potential or a second potential, depending upon the register bit states and no DC current flows between the first and second potentials.

The parity circuit is shown in FIG. 1, for determining whether an odd or even number of binary bits having a value of one, are present, at an n-bit plurality of binary operand bit inputs. The circuit includes n-stages of sequentially connected steering cells, each cell including a true-value binary bit operand input $A_{n-1}$ and a complementary-value binary bit operand input $\overline{A}_{n-1}$ for one of the plurality of operand bit inputs, a first $E_n$ and a second $O_n$ indicating potential input terminals and a first $E_{n-1}$ and a second $O_{n-1}$ indicating potential output terminals.

The first indicating potential input terminal of an i-th cell is connected to the first indicating potential output terminal of the next preceding i+1th cell and the second indicating potential input terminal of the i-th cell is connected to the second indicating potential output terminal of the next preceding i+1th cell.

A first FET device $T_1$ in each cell has its drain connected to the first indicating potential input terminal thereof, its source connected to the first indicating potential output terminal thereof, and its gate connected to the complementary-value binary bit operand input thereof.

A second FET device $T_2$ in each cell has its drain connected to the second indicating potential input terminal thereof, its source connected to the first indicating potential output terminal thereof, and its gate connected to the true-value binary bit operand input thereof.

A third FET device $T_3$ in each cell has its drain connected to the first indicating potential input terminal thereof, its source connected to the second indicating potential output terminal thereof, and its gate connected to the true-value binary bit operand input thereof.

A fourth FET device $T_4$ in each cell has its drain connected to the second indicating potential input terminal thereof, its source connected to the second indicating potential output terminal thereof, and its gate connected to the complementary-value binary bit operand input thereof.

The first FET device $T_1$ in one of the cells of interest forms a conductive path between the first indicating potential input terminal $E_n$ and the first indicating potential output terminal $E_{n-1}$ and the fourth FET device $T_4$ in the cell forming a conductive path between the second indicating potential input terminal $O_n$ and the second indicating potential output terminal $O_{n-1}$ when the complementary-value binary bit operand input $\overline{A}_{n-1}$ in the cell is active.

The third FET device $T_3$ in the cell of interest forms a conductive path between the first indicating potential input terminal $E_n$ and the second indicating potential output terminal $O_{n-1}$ and the second FET device $T_2$ in the cell forming a conductive path between the second indicating potential input terminal $O_n$ and the first indicating potential output terminal $E_{n-1}$ when the true-value binary bit operand input $A_{n-1}$ in the cell is active.

The first indicating potential input terminal in a first one of the cells in the sequence has a first potential $V_{dd}$ applied to it corresponding to a binary one bit value and the second indicating potential input terminal in the first cell has a second potential Gnd applied to it corresponding to a binary zero bit value.

The second indicating potential output terminal $O_0$ in a last one of the cells in the sequence outputs a signal corresponding to the first potential $V_{dd}$ in response to an odd number of the cells having their respective true-value binary bit operand input active indicating an odd parity and the second indicating potential output terminal $O_0$ in the last cell outputs a signal corresponding to the second potential Gnd in response to an even number of the cells having their respective true-value binary bit operand input active indicating an even parity.

The circuit shown in FIG. 1 is provided with an odd output comprising the inverter $T_5$ and $T_6$ and an even output provided by the inverter $T_7$ and $T_8$. The node $O_0$ is connected to the gate of the depletion mode active load device $T_6$ and is also connected to the gate of the enhancement mode active device $T_7$. The node $E_0$ is connected to the gate of the enhancement mode active FET device $T_5$ and the depletion mode active load FET device $T_8$. For N channel FET devices having $V_{dd}$ as a positive potential with respect to ground, when there is an even parity (an even number of binary ones in a word having an even number of binary digits), node $O_0$ will be at ground and node $E_0$ will be at a positive potential, thereby making the odd output of the inverter $T_5$ and $T_6$ at ground potential and the even output of the inverter $T_7$ and $T_8$ at positive potential. Alternately, when there is an odd parity (an odd number of binary ones for a word having an even number of binary digits), the node $O_0$ is at a positive potential and the node $E_0$ is at ground potential, thereby placing the odd output of the inverter $T_5$ and $T_6$ at a positive potential and the even output of the inverter $T_7$ and $T_8$ at ground potential

OPERATION OF THE INVENTION

Reference to FIG. 1 will show that the successive stages of the parity circuit are identical and in order to follow the operation of the circuit, the FET devices in each respective stage have been identified with the same subscript as the corresponding devices in the other stages and with a superscript prime to distinguish devices in one stage from those in another. The operation of the circuit will be illustrated for a binary word having four binary digits, and thus the four stages illustrated in FIG. 1 will be considered as the full complement of stages for a four-bit parity circuit.

Consider first the generation of a parity bit for the even parity four digit word 0011. For an N channel FET circuit, the positive potential $V_{dd}$ will be considered a binary one and ground potential will be considered a binary zero. For this example, the binary word will provide the values $A_n=0$, $A_{n-1}=0$, $A_{n-2}=1$, and $A_0=1$. Correspondingly, $\overline{A_n}=1$, $\overline{A_{n-1}}=1$, $\overline{A_{n-2}}=0$, and $\overline{A_0}=0$.

For the topmost or first stage, since $A_n=0$, ground potential is applied to the gates of transistors $T_2$ and $T_3$ keeping them off and since $\overline{A_n}=1$, $+V_{dd}$ potential will be applied to the gates of transistors $T_1$ and $T_4$ turning them on. Since the potential at the drain of the enhancement mode device $T_1$, which is $+V_{dd}$, equals the potential on the gate of the transistor $T_1$, the potential at the source of the transistor $T_1$ will be $V_{dd}$ minus $V_{th}$, that is the potential at the source of $T_1$ is equal to the potential at the drain of $T_1$ less the threshold voltage of the enhancement mode FET device $T_1$. The potential at the drain of $T_4$ is ground potential which is less than the potential at the gate of $T_4$ which is $V_{dd}$. Thus the ground potential at the drain of $T_4$ is transferred undiminished to the source of $T_4$.

At the second topmost stage of the circuit in FIG. 1, the potential at the node $E_n$ equals $V_{dd}$ minus $V_{th}$ and the potential at the node $O_n$ equals ground potential, as mentioned above. Since $A_{n-1}=0$, ground potential is applied to the gates of the transistors $T_2'$ and $T_3'$, maintaining them in an off state. Correspondingly, since $\overline{A_{n-1}}$ is a binary one, a $+V_{dd}$ potential is applied to the gates of transistors $T_1'$ and $T_4'$, maintaining them in an on state. Since the potential at the drain of the transistor $T_1'$ is $V_{dd}$ minus $V_{th}$ which is less than the gate potential at $T_1'$ of $V_{dd}$, the potential at the drain of the transistor $T_1'$ is transferred undiminished to its source so that the node $E_{n-1}$ will be at the potential of $V_{dd}$ minus $V_{th}$. It should be noticed at this point that the diminution of the potential at the drain of $T_1$ in the first stage by the threshold voltage of $T_1$, occurs only once for the entire sequence of stages in the parity circuit of FIG. 1. Since $T_4'$ is on, the ground potential at the node $O_n$ will be transferred undiminished to the node $O_{n-1}$.

At the third topmost stage in FIG. 1, the node $E_{n-1}$ equals $V_{dd}$ minus $V_{th}$ and the node $O_{n-1}$ equals ground potential. Since $A_{n-2}$ has a binary value of one, a $+V_{dd}$ potential is applied to the gates of transistors $T_2''$ and $T_3''$, maintaining both transistors in the on state. Correspondingly, since $\overline{A_{n-2}}$ has a binary zero value, ground potential is applied to the gates of the transistors $T_1''$ and $T_4''$, thereby maintaining these transistors in an off state. The ground potential at the node $O_{n-1}$ is transferred undiminished through $T_2''$ to its source at the node $E_{n-2}$. The potential $V_{dd}$ minus $V_{th}$ at the node $E_{n-1}$ is transferred through the device $T_3''$ to the node $O_{n-2}$. It should be noted here that the symmetry of the positive and ground potentials on the E and O nodes has been changed at the third stage because $A_{n-2}$ is a binary one.

At the fourth or bottommost stage in FIG. 1, the node $E_{n-2}$ is at ground potential and the node $O_{n-2}$ is at a potential of $V_{dd}$ minus $V_{th}$. Since $A_0$ has a binary one value, a $+V_{dd}$ potential is applied to the gates of transistors $T_2'''$ and $T_3'''$ maintaining these devices in an on state. Correspondingly, since $\overline{A_0}$ has a binary zero value, ground potential is applied to the gates of the transistors $T_1'''$ and $T_4'''$, maintaining these two devices in their off state. Thus, the ground potential at the node $E_{n-2}$ is transferred undiminished through the transistor device $T_3'''$ to node $O_0$. And the potential $V_{dd}$ minus $V_{th}$ at the node $O_{n-2}$ is transferred undiminished through the transistor device $T_2'''$ to the node $E_0$. Once again, it should be noticed that the symmetry of the positive potential and the ground potential for the E and O nodes has been reversed because $A_0$ is a binary one value.

All of the FET devices in FIG. 1 are enhancement mode devices except for the two depletion mode devices $T_6$ and $T_8$. When ground potential is applied at the node $O_0$ to the gate of the active depletion mode device $T_6$, it is turned almost completely off, and when the positive potential $V_{dd}$ minus $V_{th}$ at node $E_0$ is applied to the gate of enhancement mode transistor $T_5$ turning it on, the odd output of the inverter $T_5$ and $T_6$ is at ground potential corresponding to a binary zero value. One can interpret this output as indicating that the parity is not odd.

Conversely, the ground potential of the node $O_0$ is applied to the gate of the enhancement mode FET device $T_7$, turning it off, and the positive potential $V_{dd}$ minus $V_{th}$ is applied to the gate of the depletion mode active load device $T_8$, turning it fully on. Since a fully on depletion mode FET device will transfer its drain potential undiminished to its source, the even output node of the inverter $T_7$ and $T_8$ will have the potential of $V_{dd}$ which corresponds to a binary one. The even output having a value equal to a binary one can be interpreted as the four digit binary word input to the circuit having an even number of binary ones or an even parity.

A second example will now be given of an odd parity four digit binary word being processed by the circuit of FIG. 1. An example odd parity four digit binary word of 0100 will be considered. $A_n$ will equal 0, $A_{n-1}$ will equal 1, $A_{n-2}$ will equal 0, and $A_0$ will equal 0. Correspondingly, $\overline{A_n}$ will equal 1, $\overline{A_{n-1}}$ will equal 0, $\overline{A_{n-2}}$ will equal 1, and $\overline{A_0}$ will equal 1. Once again, N channel FET devices will be considered in this example so that $V_{dd}$ will be a positive potential with respect to ground.

In the first or topmost stage of FIG. 1, since $A_n$ has a binary value of zero, ground potential is applied to the gates of transistors $T_2$ and $T_3$, thereby maintaining them in an off state. Correspondingly, since $\overline{A_n}$ has a binary one value, the positive potential $V_{dd}$ will be applied to the gates of transistors $T_1$ and $T_4$, thereby maintaining them in an on state. The potential $V_{dd}$ at the drain of the transistor $T_1$ will be transferred to the source of transistor $T_1$, diminished by the threshold voltage $V_{th}$ of transistor $T_1$, in a manner similar to that described above. Correspondingly, ground potential at the drain of transistor $T_4$ will be transferred undiminished to its source. Thus, the node $E_n$ will have a potential $V_{dd}$ minus $V_{th}$ and the node $O_n$ will be at ground potential.

Since $A_{n-1}$ has a binary value of one, a positive potential of $V_{dd}$ will be applied to the gates of transistors $T_2'$ and $T_3'$, maintaining these two devices in their on state. Correspondingly, since $\overline{A_{n-1}}$ has a binary zero value, ground potential will be applied to the gates of transistor devices $T_1'$ and $T_4'$, maintaining these two devices in their off state. Thus the ground potential at the node $O_n$ will be transferred undiminished through the transistor $T_2'$ to the node $E_{n-1}$. The positive potential $V_{dd}$ minus $V_{th}$ at the node $E_n$ will be transferred undiminished through $T_3'$ to the node $O_{n-1}$.

At the third stage of the circuit in FIG. 1, since $A_{n-2}$ has a binary zero value, ground potential will be applied to the gates of transistors $T_2''$ and $T_3''$, maintaining these two devices in their off state. Correspondingly, since $\overline{A_{n-2}}$ has a binary one value, the positive potential $V_{dd}$ will be applied to the gates of transistors $T_1''$ and $T_4''$ maintaining them on. Thus, the ground potential at the node $E_{n-1}$ will be transferred undiminished to the node $E_{n-2}$. And the positive potential $V_{dd}$ minus $V_{th}$ will be transferred undiminished to the node $O_{n-2}$.

In the bottommost or fourth stage of the circuit of FIG. 1, since $A_0$ has a binary zero value, ground potential will be applied to the gates of transistors $T_2'''$ and $T_3'''$ maintaining them off. Correspondingly, since $\overline{A_0}$ has a binary one value, the positive potential $V_{dd}$ will be applied to the gates of transistors $T_1'''$ and $T_4'''$, maintaining these two devices in their on state. Thus, the ground potential at the node $E_{n-2}$ will be transferred undiminished through the transistor $T_1'''$ to the $E_0$ node. And the positive potential $V_{dd}$ minus $V_{th}$ at the node $O_{n-2}$ will be transferred undiminished through the transistor $T_4'''$ to the node $O_0$.

The positive potential at the node $O_0$ is applied to the gate of the depletion mode transistor $T_6$ and to the gate of the enhancement mode transistor $T_7$. The ground potential at the node $E_0$ is applied to the gate of the enhancement mode transistor $T_5$ and to the gate of the depletion mode transistor $T_8$. For the inverter $T_5$ and $T_6$, $T_5$ will be off and $T_6$ will be fully on and therefore the odd output will have a positive potential of $+V_{dd}$ which is a binary one value. This can be interpreted as an indication that the four digit binary word input to the circuit has an odd parity. The inverter $T_7$ and $T_8$ will have the transistor $T_7$ on and the transistor $T_8$ almost off, thereby applying ground potential at the even output, corresponding to a binary zero. This can be interpreted as an indication that the parity of the four digit binary input word is not even.

It should be noted that the nodes $O_0$ and $E_0$ which are effectively the output terminals for the sequence of stages in the transmission logic parity circuit, are input to high impedance gates of the transistors $T_5$, $T_6$, $T_7$ and $T_8$. Thus it is seen that no DC current will flow through the successive stages of the parity circuit and therefore the circuit consumes virtually no DC power. The output stages consisting of the inverter $T_5$ and $T_6$ and the inverter $T_7$ and $T_8$ are static logic inverters and their depletion mode active loads $T_6$ and $T_8$, respectively, provide for full valued signal swings from ground potential to $+V_{dd}$.

It is seen from FIG. 1 that the circuit topology for the transmission logic parity circuit is simple and its layout area is small when compared to prior art parity circuits. It should be appreciated that the circuit shown in FIG. 1 can either be an N channel FET circuit or a P channel FET circuit. In either case, the circuit is of a higher density than would be complementary MOSFET circuitry and yet the topology of the circuit shown in FIG. 1 achieves a low power dissipation, an advantage typically only available with CMOS circuits.

Although a specific embodiment of the invention has been disclosed, it will be understood by those of skill in the art that the foregoing and other changes in form and details may be made therein without departing from the spirit and scope of the invention.

Having thus described our invention, what we claim as new, and desire to secure by Letters Patent is:

1. A parity circuit for determining whether an odd or even number of binary bits having an even number of binary bits having a value of one, are present, at an n-bit plurality of binary operand bit inputs, comprising:
   n-stages of sequentially connected steering cells, each said cell including a true-value binary bit operand input and a complementary-value binary bit operand input for one said plurality of operand bit inputs, a first and a second indicating potential input terminals and a first and a second indicating potential output terminals;

said first indicating potential input terminal of an i-th cell connected to said first indicating potential output terminal of the next preceding i+1th cell and said second indicating potential input terminal of said i-th cell connected to said second indicating potential output terminal of said next preceding i+1th cell;

a first FET device in each said cell having its drain connected to said first indicating potential input terminal thereof, its source connected to said first indicating potential output terminal thereof, and its gate connected to said complementary-value binary bit operand input thereof;

a second FET device in each said cell having its drain connected to said second indicating potential input terminal thereof, its source connected to said first indicating potential output terminal thereof, and its gate connected to said true-value binary bit operand input thereof;

a third FET device in each said cell having its drain connected to said first indicating potential input terminal thereof, its source connected to said second indicating potential output terminal thereof, and its gate connected to said true-value binary bit operand input thereof;

a fourth FET device in each said cell having its drain connected to said second indicating potential input terminal thereof, its source connected to said second indicating potential output terminal thereof, and its gate connected to said complementary-value binary bit operand input thereof;

said first FET device in each of said cells forming a conductive path between said first indicating potential input terminal and said first indicating potential output terminal and said fourth FET device in the same cell forming a conductive path between said second indicating potential input terminal and said second indicating potential output terminal when said complementary-value binary bit operand input in the same cell is active;

said third FET device in each of said cells forming a conductive path between said first indicating potential input terminal and said second indicating potential output terminal and said second FET device in the same cell forming a conductive path between said second indicating potential input terminal and said first indicating potential output terminal when said true-value binary bit operand input in the same cell is active;

said first indicating potential input terminal in a first one of said cells in said sequence having a first DC potential continuously applied to it corresponding to a binary one bit value and said second indicating potential input terminal in said first one of said cells having a second DC potential continuously applied to it corresponding to a binary zero bit value said first DC potential being different from said second DC potential;

said second indicating potential output terminal in a last one of said cells in said sequence outputting a signal corresponding to said first DC potential in response to an odd number of said cells having their respective true-value binary bit operand input active indicating an odd parity and said second indicating potential output terminal in said last cell outputting a signal corresponding to said second DC potential in response to an even number of said cells having their respective true-value binary bit operand input active indicating an even parity.

2. The parity circuit of claim 1, which further comprises:

a fifth FET device having its gate connected to the first indicating potential output terminal of said last one of said cells in said sequence, its drain connected to an odd output node and its source connected to said second potential;

a sixth FET device having its gate connected to said second indicating potential output in said last one of said cells in said sequence, its drain connected to said first potential and its source connected to said odd output node;

said odd output node having said first potential in response to an odd number of said cells having their respective true value binary bit operand input active indicating an odd parity.

3. The parity circuit of claim 2, which further comprises:

a seventh FET device having its gate connected to said second indicating potential output in said last one of said cells in said sequence, having its drain connected to an even output node and its source connected to said second potential;

an eighth FET device having its gate connected to said first indicating potential output terminal in said last one of said cells in said sequence, its drain connected to said first potential and its source connected to said even output node;

said even output node having said first potential in response to an even number of said cells having their respective true value binary bit operand input active indicating an even parity.

* * * * *